Patented June 20, 1944

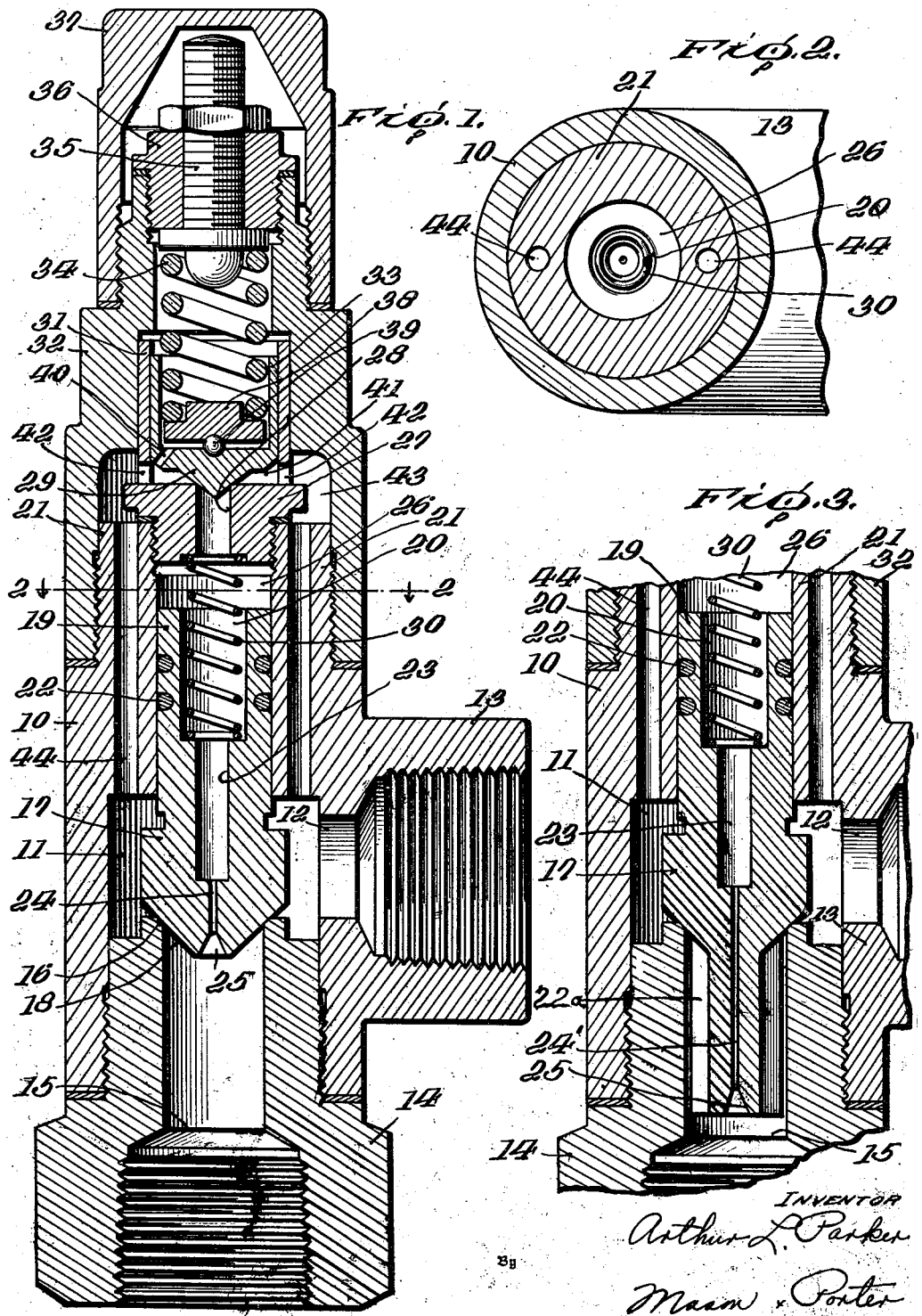

2,351,871

UNITED STATES PATENT OFFICE 2,351,871

VALVE ASSEMBLY

Arthur L. Parker, Cleveland, Ohio, assignor to The Parker Appliance Company, Cleveland, Ohio, a corporation of Ohio Application March 31, 1941, Serial No. 386,197

1 Claim. (Cl. 137—53)

The present invention relates to new and useful improvements in a pressure responsive valve assembly, and more particularly to improvements in a regulating valve for maintaining a substantially constant upper limit pressure in a fluid pressure system.

In various pressure systems, such as high pressure hydraulic systems, it is desirable to maintain a substantially constant uniform predetermined pressure in the line in order to prevent pressure surges therein. Various types of valves have been employed for this purpose and these valves are generally responsive to the pressure in the line and operate as relief valves permitting the escape of fluid or the by-passing and return of the fluid to a supply tank or reservoir when the line pressure reaches a predetermined degree. In simple forms of relief valves, springs are employed for seating the valve member and these springs must often be relatively heavy in order to overcome the tendency of the fluid pressure to unseat the valve member. In other types of relief valves, particularly in high pressure fluid systems, an auxiliary or pilot valve may be utilized for controlling movements of the main valve member and the present invention is particularly concerned with this latter type of relief valve assembly. In a typical installation of such a relief valve assembly by way of illustration, the valve casing includes an internal chamber which is in communication with the pressure supply line of the system and with a discharge or return line which may be connected to a supply tank or reservoir. As indicated above, an auxiliary or pilot valve is employed for controlling movements of the main valve member which is installed for the purpose of controlling the direct passage of fluid between the supply line and the discharge or return line.

An object of the present invention is to provide a valve assembly of the above type which is particularly designed for use in a high pressure fluid system and wherein the main valve member is substantially balanced by the fluid under pressure so that a relatively light spring may be employed for seating the said main valve member.

A further object of the invention is to provide a valve assembly of the above type wherein the auxiliary or pilot valve is employed for controlling the fluid balancing of the main valve member so as to effect rapid response to pressure variations in the line.

A still further object of the invention is to provide a valve assembly of the above type wherein the main valve member is guided above and below the valve seat so as to assure proper seating of the valve member and so that the valve assembly can be conveniently employed with high pressure fluid systems.

The above and other objects of the invention will in part be obvious and will be hereinafter more fully pointed out.

In the accompanying drawing:

Figure 1 is a longitudinal sectional view through the valve assembly and showing the pilot valve and the main valve closed.

Figure 2 is a sectional view taken along the line 2—2 of Figure 1.

Figure 3 is a detail sectional view of a modified form showing the guiding of the valve member below the valve seat.

Referring more in detail to the accompanying drawing, the valve casing is illustrated as including an open-ended body portion 10 in the form of a main valve housing which is provided with an internal chamber 11. The body portion 10 is provided with an escape or return opening 12 extending through the side wall thereof and communicating with a lateral extension 13 which may be internally threaded so as to facilitate its connection to suitable conduit means adapted to lead to a supply tank or reservoir (not shown). One end of the body portion 10 is internally threaded to receive an externally threaded adapter 14 which is provided with a longitudinal passage 15 therethrough. The adapter 14 is adapted to be connected through suitable conduit means with the pressure supply line through which fluid is forced by a pump or the like. The inner end of the adapter 14 is provided with a valve seat 16 extending around the inner end of the passage 15. Thus, direct communication between the inlet passage 15 and the discharge port 12 is afforded through the chamber 11 and the flow of fluid therethrough is adapted to be controlled by a main valve member which cooperates with the valve seat 16.

The main valve member 17 extends through the chamber 11 and is provided with a conical portion 18 which is adapted to cooperate with the valve seat 16. The opposite end portion of the valve member 17 is in the form of a sleeve 19 which defines an internal recess 20. The sleeve portion 19 snugly fits within an inwardly extending cylindrical portion 21 on the casing 10 and is adapted to be guided thereby. Suitable packing rings 22 may be carried by the sleeve portion 19 so as to effect a fluid tight seal. As indicated in Figure 3, the conical end portion 18 of the main valve member may be extended and provided with spaced ribs 22a which engage the inner surface of the passage 15 and thus serve to guide the main valve member below the valve seat. In this form of the invention, it will be seen that the main valve member is guided on opposite sides of the valve seat for rectilinear movement and such a construction is often of advantage in that it additionally serves to maintain the valve member in proper alignment so as to insure a tight fluid contact with the valve seat.

Between the surface 18 and the recess 20, the valve member is provided with a longitudinal passage 23 which communicates with the recess 20 and also communicates with a relatively small longitudinal aperature 24 which is in communication with the passage 15 and the fluid under pressure in the supply line. The apex of the valve surface 18 may be shaped to provide an inverted V- or funnel-shaped recess 25 which serves to minimize turbulence of the fluid flowing through the aperture 24 and to thus reduce chattering of the valve. Thus fluid under pressure in the supply line will gain access to the relatively small aperture 24 through the passage 15 in the adapter 14. From the aperture 24, the fluid under pressure can pass through the aperture 23 and through the recess 20 into a chamber 26 which is disposed above the main valve member. This chamber 26 is normally closed by a plug member 27 which threadedly engages the inner end of the cylindrical portion 21 on the valve housing 10. The plug 27 is provided with a longitudinal passage 28 which communicates with the chamber 26 and the outer end of this passage provides a seat with which an auxiliary or pilot valve 29 is adapted to cooperate. The pilot valve 29 is cone shaped so that the apex thereof extends into the passage 28 when closed. It will be seen that the opposite ends of the main valve member are subjected to the fluid pressure existing in the supply line and these opposite ends of the main valve member are dimensioned so as to present substantially identical areas to the fluid under pressure which thus substantially balances the main valve member. By thus providing a fluid pressure balance for the main valve member, a relatively light spring 30 can be employed for returning the balanced main valve member to a closed or seated position. One end of the spring 30 bears against the inner end of the plug 27 and the opposite end of the spring bears against the valve member 17 at the inner end of the recess 20 and this spring is such as to exert only a light pressure on the valve member.

The plug member 27 is provided with an upwardly extending skirt portion 31 which fits within the inner surface of an upper casing member 32 which, in turn, threadedly engages the adjacent end of the portion 21 on the valve housing 10. The pilot valve 29 includes a cylindrical sleeve portion 33 which is integral therewith and which extends within the sleeve portion 31 on the plug 27 and is guided thereby. A coil spring 34 is disposed within the sleeve portion 33 and one end thereof bears against an adjustable bolt 35 which is carried by a closing plug 36 at the top of the upper casing member 32. A cap 37 threadedly engages the upper casing member 32 and serves to house the adjusting bolt 35. The opposite end of the spring 34 is in contact with a bearing plate 38 which is spaced from the inner surface of the pilot valve 29 by a ball 39 which is centrally located so as to center the pressure exerted by the spring 34 on the pilot valve. The pilot valve 29 is provided with an aperture 40 adjacent the sleeve portion 33 and this aperture provides communication between a chamber 41 above the plug 27 and the chamber within which the spring 34 is housed. The aperture 40 serves to drain fluid from the chamber within which the spring 34 is housed, although it may serve to provide a dash-pot arrangement to prevent rapid movements of the pilot valve in the event that fluid gains access thereto more rapidly than it can drain therefrom. The skirt portion 31 of the plug member 27 is provided with radial ports 42 affording communication between the chamber 41 and an annular chamber 43 around the plug member. The annular chamber 43 is in communication with the chamber 11 through the longitudinal passages 44 which extend through the cylindrical portion 21 of the valve housing 10.

In a typical hydraulic pressure system with which the present valve assembly may be employed, a pump is adapted to draw fluid from a tank or reservoir and direct the withdrawn fluid through the pressure line. The valve assembly is adapted to maintain a substantially constant predetermined upper limit for the pressure in the supply line and is installed in the line on the pressure side of the pump. The inlet passage 15 through the adapter 14 is thus in communication with the pressure line and the port 12 communicates with a conduit leading back to the reservoir or tank and this conduit is connected to the lateral extension 13 on the body portion of the valve casing. The auxiliary valve 29 is set to open at a predetermined maximum fluid pressure and this is effected by adjusting the spring 34 by means of the bolt 35. Fluid under pressure entering through the inlet passage 15 will exert a pressure on the bottom of the main valve member 17 and a part of this fluid will also gain access to the chamber 26 through the passages 24, 23. Thus, the line pressure will also be transferred to the chamber 26 so that the opposite end of the main valve member will be subjected to this pressure. The exposed areas at the opposite ends of the main valve are approximately equal so that the valve member is balanced by the fluid pressure. The relatively light spring 30 is for the purpose of returning the balanced main valve member to its normally seated position. The spring 34 is acted on by the line pressure which gains access to the pilot valve through the passage 28 and is initially set to open only when the line pressure rises above a predetermined maximum degree.

In operation, it will be seen that when the line pressure rises above the predetermined maximum, this pressure within the chamber 26 will force the pilot valve 29 away from its seat against the action of the spring 34 so that fluid will escape into the chamber 41 and through the ports 42 into the chamber 43. From the chamber 43, the fluid will drain through the ports 44 into the valve chamber 11 and ultimately through the return port 12. The spring 34 is set by the adjusting bolt 35 so that the auxiliary or pilot valve 29 will open as soon as a predetermined pressure is reached within the pressure line. Thus, if the spring is set so that the pilot valve will open when the pressure in the line exceeds 1,500 pounds per sq. in., any pressure increase above the predetermined setting will be transmitted through the restricted aperture 24, the passage 23 and into the chamber 26. This increased pressure in the chamber 26 will immediately react on the closed pilot valve 29 so as to cause the same to open against the action of the spring 34. When the pilot valve is open, the fluid will pass through the opening 28 and through the ports 27 into the annular chamber 43, from which it will pass through the ports 44 into the chamber 11 and thence into the discharge port 12. The opening 28 is larger in diameter than the restricted aperture 24 so that the fluid will more rapidly pass from the chamber 26 than it will be admitted thereto so that the pressure in the chamber 26 tends to remain substantially constant according to the predetermined setting. As soon as any increased pressure is transmitted to the chamber 26, the pilot valve will be opened so that this pressure will be relieved and the increased pressure in the supply line will act on the end 18 of the main valve member and cause the same to open. In other words, as soon as the pressure in the supply line rises above the predetermined set degree, the pilot valve will be opened and the main valve member will thus be unbalanced so that the increased pressure in the supply line will cause the main valve member to open and permit direct passage of the fluid from the inlet port 15 to the return port 12. When the line pressure has returned to the predetermined set degree, the pilot valve 29 will be immediately seated on the plug 27 so as to close the passage 28 and the main valve member will again be balanced at opposite ends thereof by the fluid pressure in the line. The light spring 30 will tend to immediately seat the balanced main valve member.

From the foregoing description, it will be seen that a highly sensitive and efficient relief valve is herewith provided and this relief valve is of particular importance in its use with high pressure fluid systems. It is to be clearly understood that minor changes in the details of construction and arrangement of parts may be made without departing from the scope of the invention as set forth in the appended claim.

I claim:

A relief valve for fluid pressure systems comprising a lower valve casing having a cylindrical bore extending longitudinally thereof, an adapter threaded into the lower end of the valve casing and having a port in alignment with the bore in the valve casing, said bore forming a valve seat surrounding the inner end of the port in the adapter, a chamber in the valve casing surrounding the valve seat and communicating with an exhaust, the bore in the valve casing above said chamber being of slightly greater diameter than the bore in the adapter, a valve stem slidable in said bore in the casing above said chamber, a valve head carried by the valve stem and adapted to engage said seat, said valve having a passage centrally therethrough leading to a chamber at the upper end of the valve casing, said passage at the upper end of the valve stem being enlarged and forming a recess for a spring, a plug secured to the upper end of the valve casing and having an opening therethrough, a spring in the recess in the valve stem bearing against said plug as an abutment, an upper casing having a threaded and telescoping engagement with the lower casing and forming a chamber surrounding the plug, said plug having a sleeve formed integrally therewith provided with ports therethrough adjacent the plug and communicating with the chamber in the upper casing, an auxiliary valve mounted in said sleeve for reciprocation, an opening through said auxiliary valve connecting the upper side thereof with the lower side, an adjustable abutment mounted in the upper casing, a spring disposed between said abutment and said auxiliary valve for normally holding said auxiliary valve closed, said lower valve casing having ports in the walls extending longitudinally of the lower valve chamber and connecting the chamber at the upper end of the casing with the chamber surrounding the valve seat.

ARTHUR L. PARKER.